United States Patent [19]
Owen et al.

[11] 4,059,215
[45] Nov. 22, 1977

[54] CIRCULAR DOUBLE-JACKETED GASKET WITH SINGLE JOINT

[75] Inventors: Alfred B. Owen; Bruce M. Gifford, both of Houston, Tex.

[73] Assignee: Lamons Metal Gasket Company

[21] Appl. No.: 610,561

[22] Filed: Sept. 5, 1975

Related U.S. Application Data

[63] Continuation-in-part of Ser. No. 534,436, Dec. 19, 1974, abandoned.

[51] Int. Cl.² .............................................. F16J 15/12
[52] U.S. Cl. .............................. 228/173 C; 277/229; 277/234; 29/509; 72/171; 72/177
[58] Field of Search ............... 228/173, 149, 141, 144, 228/153, 190, 13, 15.1, 16, 17; 277/232, 233, 234, 235, 235 A, 204, 229; 113/116 Y; 29/429, 430, 509; 72/176, 179, 181, 170, 171, 177

[56] References Cited
U.S. PATENT DOCUMENTS

| | | | |
|---|---|---|---|
| 595,287 | 12/1897 | Carlstedt | 72/179 X |
| 1,643,561 | 9/1927 | Kinzel | 277/229 X |
| 1,715,356 | 6/1929 | Griffith | 277/232 |
| 2,330,662 | 9/1943 | Balfe | 29/509 |
| 2,459,721 | 1/1949 | Poltorak | 277/229 X |
| 2,484,693 | 10/1949 | De Witt et al. | 277/229 X |
| 2,920,678 | 1/1960 | Cunningham et al. | 72/170 X |
| 2,967,727 | 1/1961 | Wills | 277/229 X |
| 3,737,966 | 6/1973 | Ranz | 113/116 Y |

*Primary Examiner*—Al Lawrence Smith
*Assistant Examiner*—K. J. Ramsey
*Attorney, Agent, or Firm*—Pravel, Wilson & Gambrell

[57] ABSTRACT

A new and improved method and apparatus for forming a circular double-jacketed gasket and the new and improved double-jacketed gasket formed thereby, wherein a substantially linear double-jacketed gasket assembly having a substantially rectangular cross-section is formed from first and second metal strips and a core strip of filler material, and wherein the gasket assembly is edgewise curved in the plane of its greater dimension to a predetermined curvature in the nip between compression rolls, and thereafter, a circular gasket unit is severed from the gasket assembly and the ends of the severed gasket unit are secured by welding to form a circular gasket having a single joint connection in the entire circumference of the gasket.

41 Claims, 24 Drawing Figures

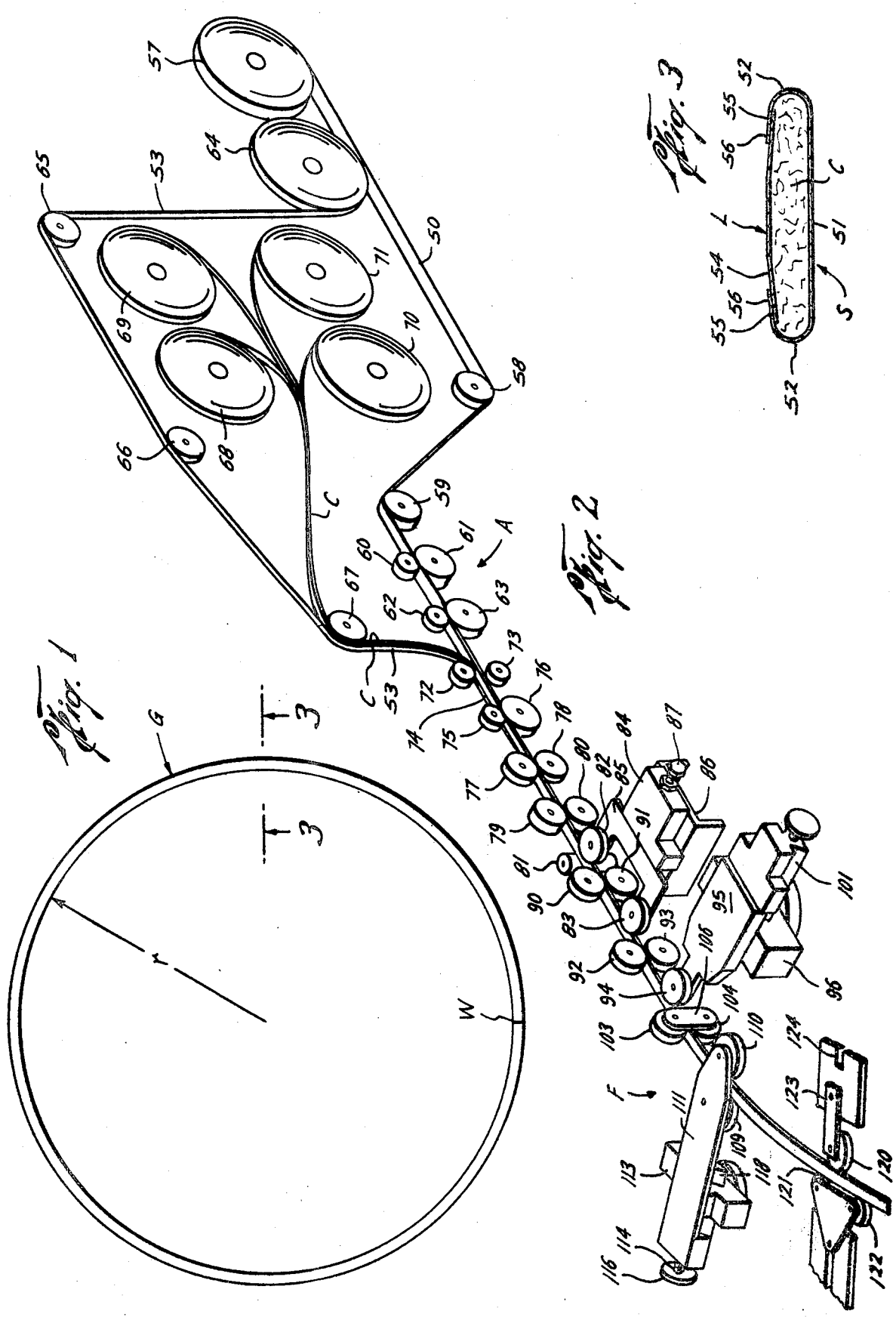

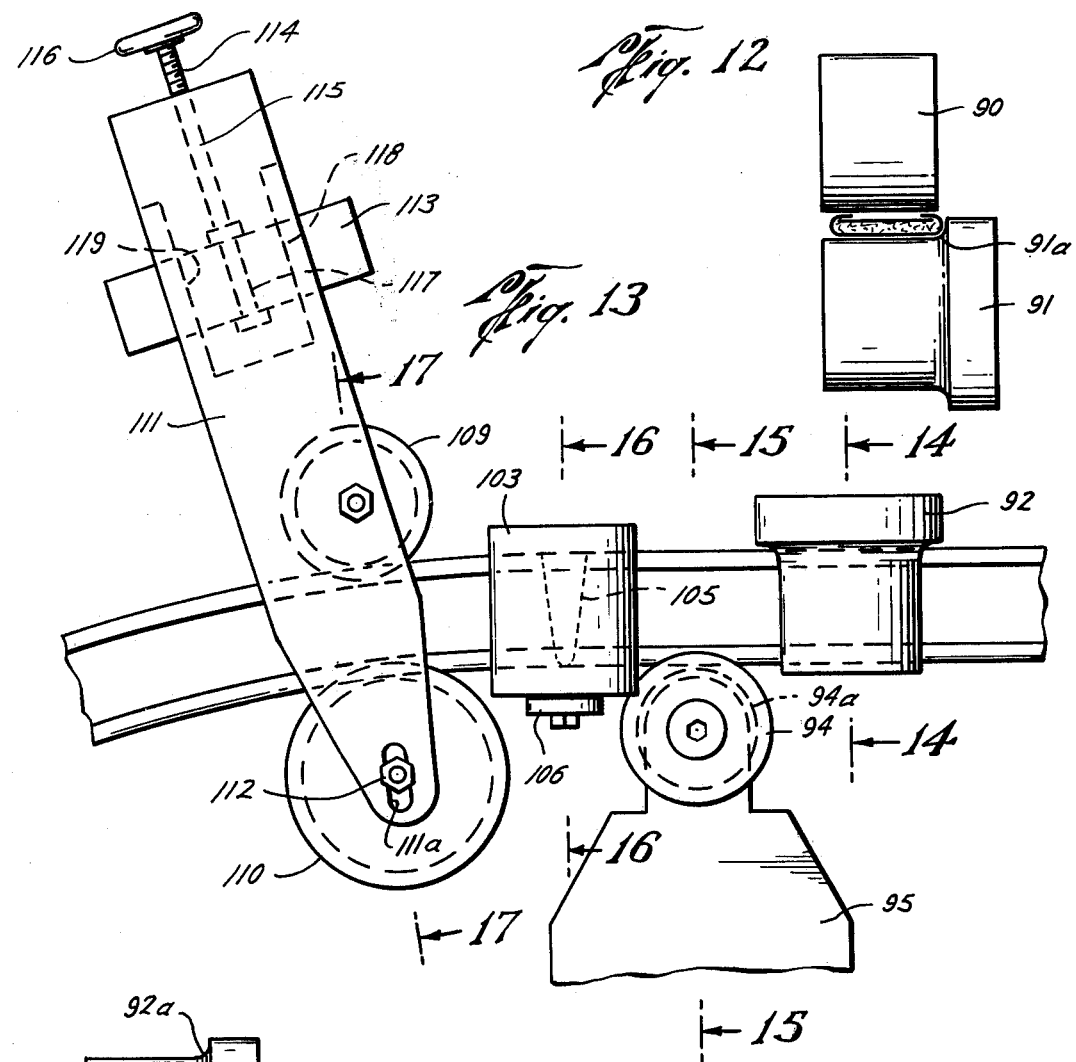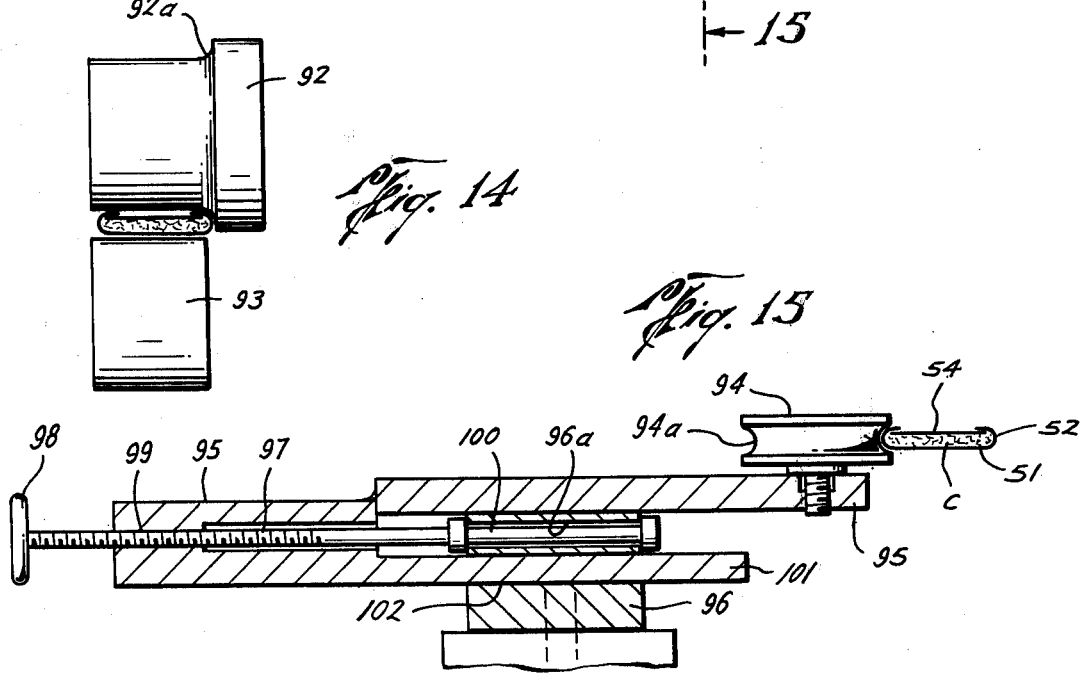

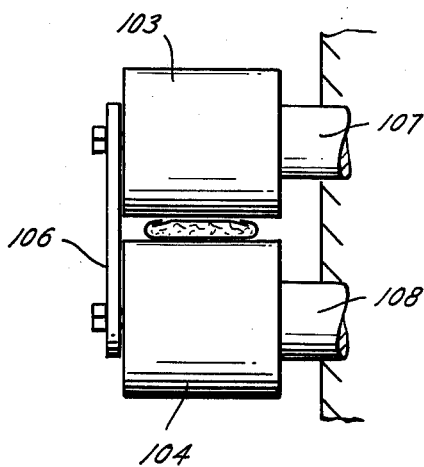
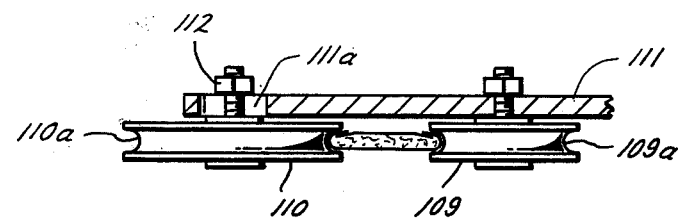
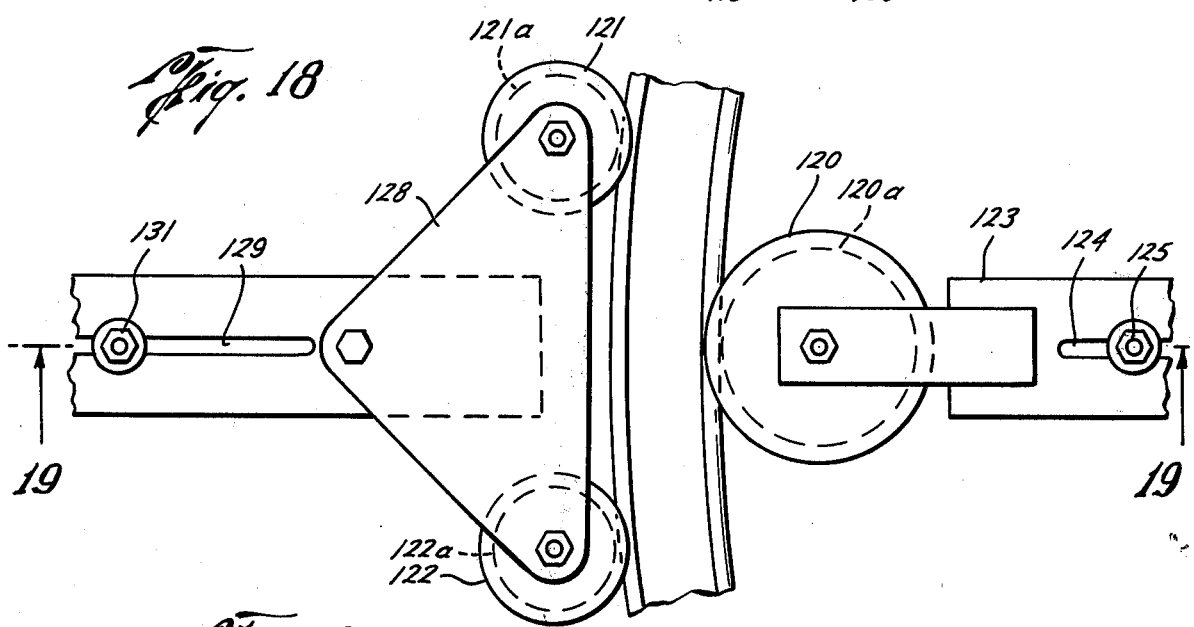
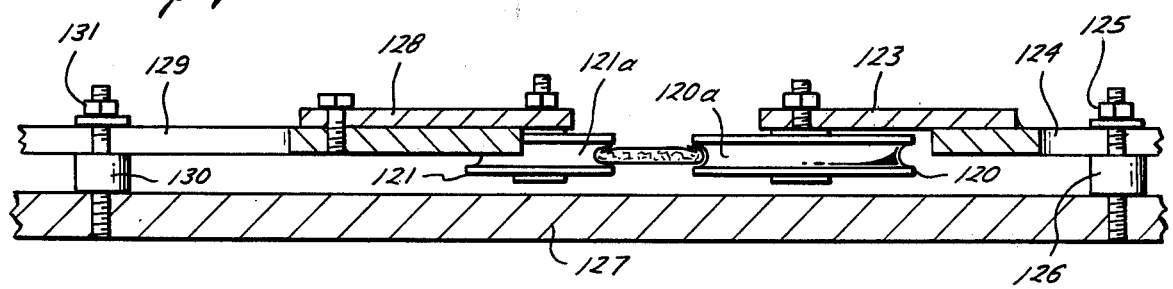

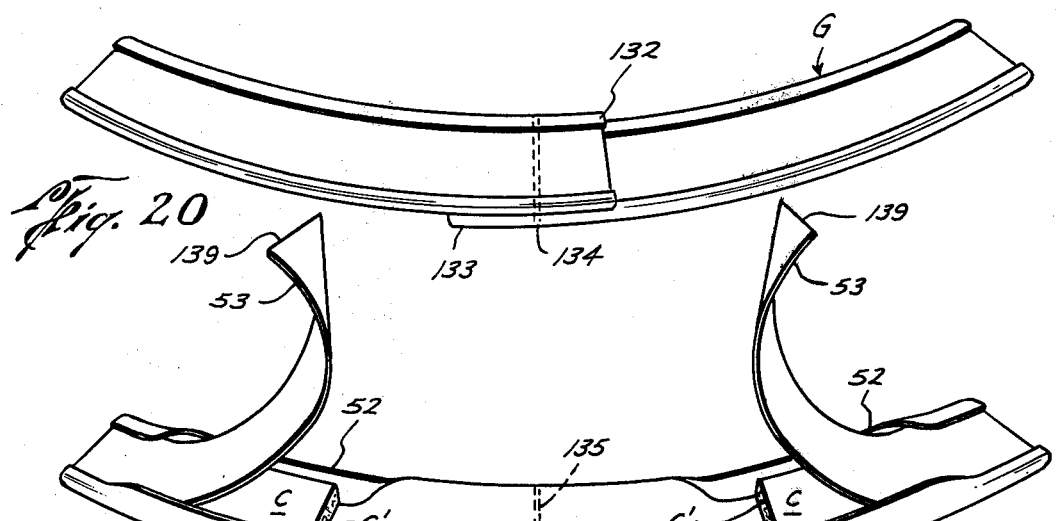
Fig. 20
Fig. 21
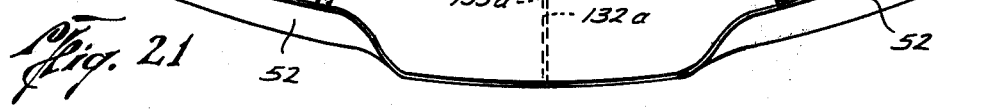
Fig. 22
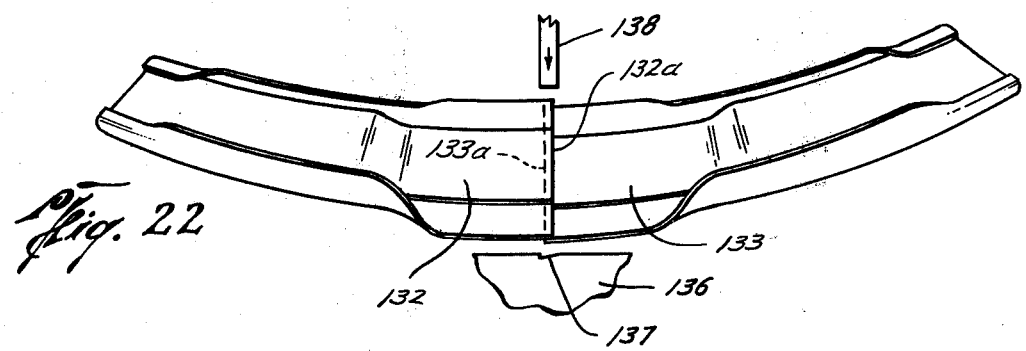
Fig. 23
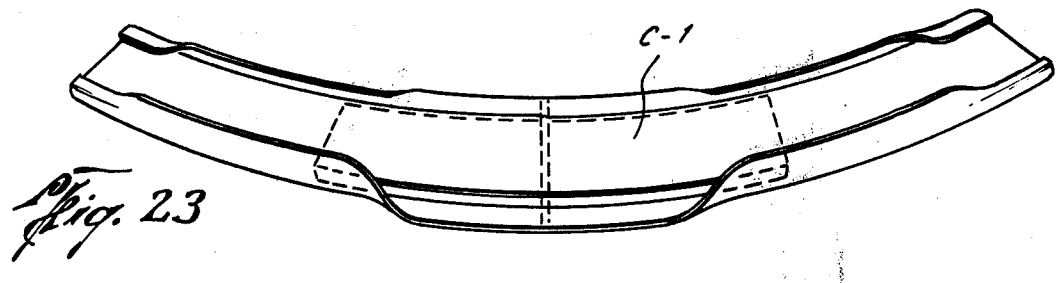
Fig. 24
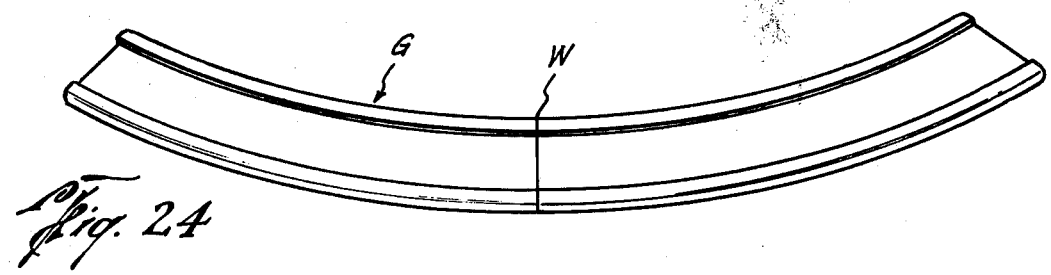

CIRCULAR DOUBLE-JACKETED GASKET WITH SINGLE JOINT

CROSS-REFERENCE TO RELATED APPLICATIONS

This application is a continuation-in-part of application Ser. No. 534,463 filed Dec. 19, 1974, now abandoned.

BACKGROUND OF THE INVENTION

This invention relates generally to the field of double-jacketed metal gaskets.

So far as known, the prior art method of forming circular double-jacketed metal gaskets has consisted of an extremely tedious and time-consuming job of making a circular double-jacketed gasket from a plurality of large metal sheets. Metal sheets for use in making double-jacketed gaskets typically have been purchased in rolls of 3 to 4 feet in width. Such gaskets are made in various diameters and widths, depending upon the equipment with which they are used. For large reactors or other equipment, gaskets often must be as large as 180 to 190 inches in diameter; thus, when the gasket diameter is larger than the sheet width, it has been necessary to weld together two or more sheets to form a single sheet for each side of the double-jacketed gasket. Hence, the number of welds or joint connections in a gasket has heretofore depending upon the width of the rolls of metal and the diameter of the desired gasket.

After the sheets have been prepared to the proper size for the diameter of the gasket to be made, a series of cutting steps have been employed to form the outer gasket ring of one width and an inner circular gasket liner of a lesser width. Each of such members has been cut from a single sheet formed as described above and each has been very narrow compared to the size of each sheet, resulting in 70% to 90% of the metal of each sheet being unused, and usually sold as scrap.

The final gasket itself has then been formed by hand positioning an intermediate ring or sections of asbestos between the outer gasket strip and the liner, and then crimping the outer ring over the inner liner.

The above-described prior art procedure is a tedious, time consuming operation that requires much hand labor. While certain machines have been designed to perform the steps of welding the plural sheets together and cutting out the circular gaskets, it has been necessary to still do many of such operations by hand. The large amounts of scrap material and the use of a great deal of hand labor has made the manufacture of each gasket very costly.

SUMMARY OF THE INVENTION

This invention relates to a new and improved apparatus and method for forming a circular double-jacketed gasket from a plurality of linear strips of metal and a strip of core material of asbestos fiber or the like. A linear gasket assembly is formed by bending the metal strips with a plurality of forming rolls to form a substantially rectangular metal shell encasing the core material. A curving means including a pair of compression rolls and a plurality of adjustable bending rolls curve or bend the linear gasket assembly a predetermined amount to form a circular gasket assembly which may be spiral in form. In the preferred embodiment, the curvature of the assembly is reduced a predetermined amount by bending rollers to relieve stresses in the metal shell and to provide a uniform curvature to the gasket assembly. A circular gasket unit is usually formed by cutting same from the continuous spiral gasket assembly and then the ends are welded to form the new and improved gasket of this invention.

BRIEF DESCRIPTION OF THE DRAWINGS

FIG. 1 is a plan view of the new and improved gasket;

FIG. 2 is a schematic perspective representation of the new and improved apparatus for performing the new and improved method;

FIG. 3 is an enlarged cross-section taken along section line 3—3 in FIG. 1;

FIG. 12 is an enlarged cross-section taken along section line 12—12 in FIG. 10;

FIG. 13 is an enlarged plan view showing the curvature forming components of FIG. 2;

FIG. 14 is an enlarged cross-section taken along section line 14—14 in FIG. 13;

FIG. 15 is an enlarged cross-section taken along section line 15—15 in FIG. 13;

FIG. 16 is an enlarged cross-section taken along section line 16—16 in FIG. 13;

FIG. 17 is an enlarged cross-section taken along section line 17—17 in FIG. 13;

FIG. 18 is an enlarged plan view showing another portion of the curvature forming components of FIG. 2;

FIG. 19 is an enlarged cross-section taken along section line 19—19 in FIG. 18; and FIGS. 20, 21, 22, 23 and 24 illustrate the steps of forming the single weld in the gasket unit after the circular gasket assembly is formed by the apparatus of FIG. 2.

DESCRIPTION OF THE PREFERRED EMBODIMENTS

Figure 4:
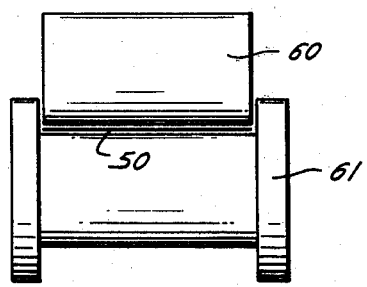
FIGS. 4, 5, 6, 7, 8 and 9 are enlarged cross-sections illustrating the apparatus and steps in the new and improved method of forming the new and improved gasket.

In the drawings, the letter G designates generally the new and improved gasket of this invention (FIG. 1) which is formed by the new and improved method and apparatus described hereinafter, wherein the radius r defining the curvature of the gasket G is determined by the adjustment of the gasket forming apparatus, and the gasket G is completed by a single weld W formed in the circumference of the metal casing of the gasket G.

As best seen in the enlarged cross-section of FIG. 3, the gasket includes a casing or shell generally designated S with an inner core C which typically comprises one or more strips of asbestos or similar soft yieldable material tightly confined within the shell S. The shell S includes a base portion 51, side portions 52, and end portions 56. A liner L is mounted on one side of the shell S with the core C therebetween. The outer edges 55 of the liner L are confined by the end portions 56 of the shell S.

Figure 5:
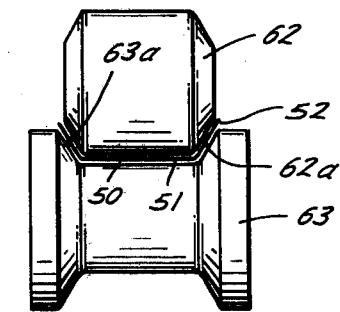

The apparatus of this invention is generally designated by the letter A (FIG. 2), and the apparatus includes a first roll 57 of metal strip 50 that forms the shell S. The shell strip 50 passes over guide rolls 58 and 59. It is understood that all the rolls of the apparatus are conventionally mounted for rotation about bearings. Strip 50 is further directed between power feed rolls 60 and 61 shown in detail in FIG. 4. Strip 50 is next directed to initial forming rolls 62 and 63, which are shown in detail in FIG. 5, where the side portions 52 of the strip 50 are bent upwardly at an angle of about 45 degrees, by bending surfaces 62a and 63a in the initial forming step.

A second roll 64 of metal strip 53 provides the liner L. Guide rolls 65 and 66 direct the liner strip 53 to a roll 67 where it is combined with the filler core C of asbestos strip. A plurality of supply rolls 68, 69, 70 and 71, the number of which may vary, are provided so that each supplies a thin strip of asbestos, which are superimposed to form the core C.

Figure 6:
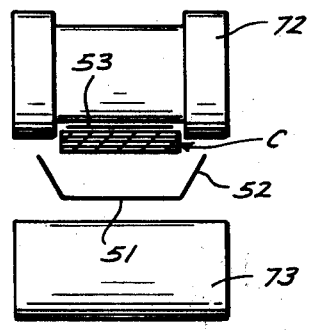

The liner L and the core C are both directed over the roll 67 to the assembly roll 72 which is shown in detail in FIG. 6. Assembly roll 73 is displaced below the normal path of the shell strip 50 passing through the initial forming rolls 62 and 63.

Figure 7:
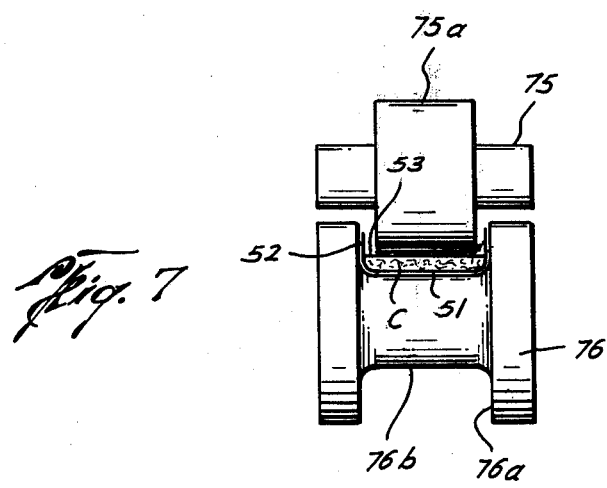

The shell S and liner L with the core portion therebetween are next directed between forming rolls 75 and 76 as shown in FIG. 7 to form a gasket assembly. The side portions 52 of the shell S are curved upwardly to an angle of approximately 90° as shown in FIG. 7 by the forming side 76a of the forming roll 76. The central portion 75a of the forming roll 75 presses the liner L and the core C against the base portion 51 of the shell so that the liner L and the core C are positioned between sides 52 of the shell S. The center portion 76b of the forming rolls 76 is in contact with the base portion 51 of the shell.

Figure 8:
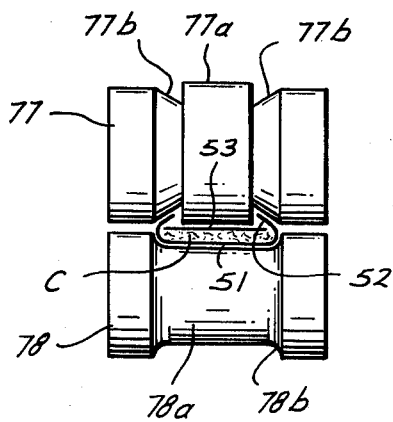
Figure 9:
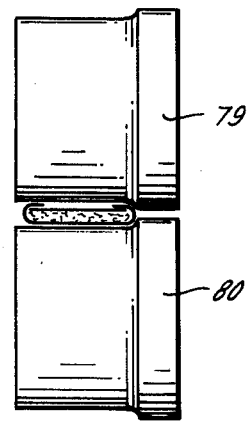

The gasket assembly 74 is next directed to the forming rolls 77 and 78 which are best shown in FIG. 8. The upper forming roll 77 includes a center portion 77a that presses against the base portion 54 to compress the gasket assembly against the center portion 78a of the forming roll 78. The side portions 78b are curved to facilitate the bending of shell side portions 52. Surfaces 77b engage the side portions 52 of the shell S and further bend the side portions inwardly to an angle of about 45° as shown in FIG. 8. Additional forming rolls 79 and 80 as shown in FIG. 9 further bend the side portions 52 downwardly to a position adjacent the base portion 54 of the liner L.

Figure 10:
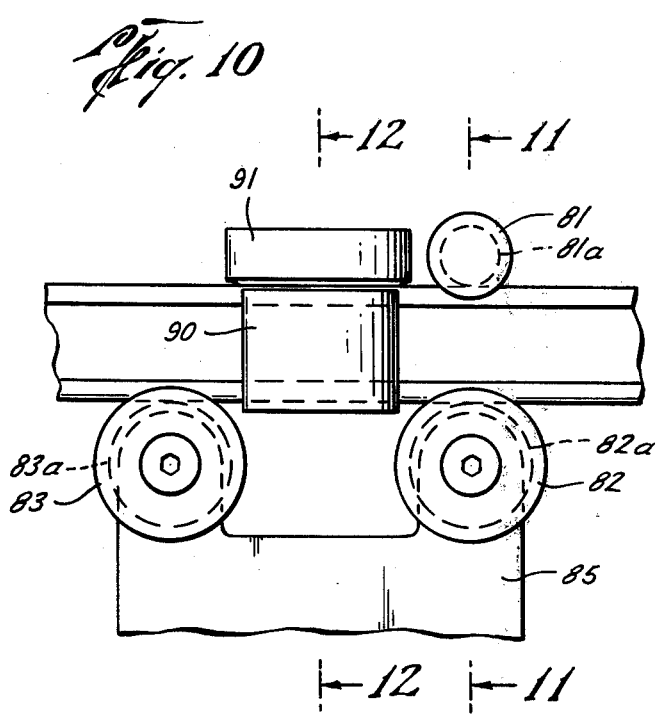
FIG. 10 is an enlarged plan view showing a portion of the apparatus of FIG. 1.
Figure 11:
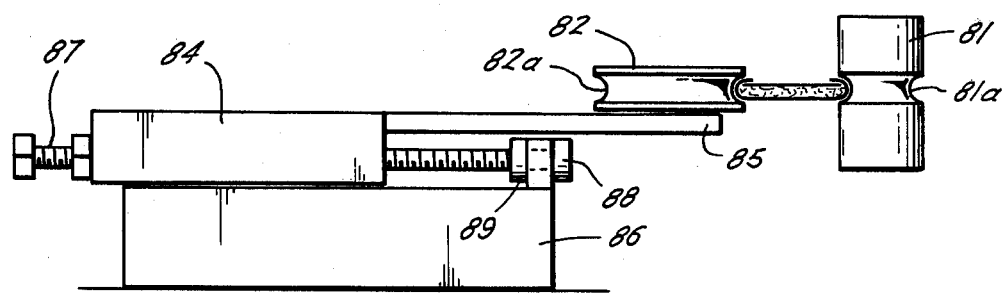
FIG. 11 is an enlarged cross-section taken along section line 11—11 in FIG. 10.

The final plurality of forming rollers is illustrated in detail in FIG. 10. The edge rolls 81, 82 and 83 engage the sides of the gasket assembly with the sides of the gasket assembly being further shaped by the curved walls of the roll forming grooves 81a, 82a and 83a. The edge rolls 82 and 83, which are similar in construction, are mounted on an adjustable support 84 which includes a support arm 85 which mounts the rollers 82 and 83. The adjustable support 84 is slidably mounted upon the machine support 86 and is adjustable relative thereto by adjusting screw 87 which is threadably mounted to the support 84 and rotatably mounted by the collar 88 on the bifurcated bracket 89. The adjustable support 84 may be adjusted by the adjusting screw 87 to vary the amount of force exerted by the forming grooves 82a and 83a on the side portions of the gasket assembly. Forming rolls 90 and 91 as shown in FIG. 12 are mounted between the edge rollers 82 and 83 and act to compress the metal shell around the core C. Further forming rolls 92 and 93, shown in detail in FIG. 14, further compress the gasket assembly to provide a gasket assembly having a substantially rectangular cross-section as further illustrated and explained in connection with FIG. 3. Curved portions 91a and 92a of forming rollers 91 and 92, respectively, engage the edges or sides of the gasket assembly to constrain the gasket assembly under the compressive force of forming rollers 90, 91, 92 and 93.

The curve forming or bending portion F of the apparatus A edgewise bends or curves the up-to-now linear gasket assembly to form a curved gasket assembly of a desired radius of curvature r (FIG. 1). The bending portion F includes a first edge engaging roller 94 as best shown in FIGS. 13 and 15. The edge engaging roll 94 includes an annular groove 94a, the walls of which engage the side portion 52 of the gasket assembly. Roll 94 is conventionally mounted to rotate on a support arm 95 which is mounted in any conventional manner for sliding movement on machine support 96. An adjusting screw 96 having an adjusting knob 98 is threadably mounted at 99 in a portion of the support arm 95. The adjusting screw is rotatably mounted by collar portion 100 in an aperature 96a in the machine support such that adjusting knob 98 will move the support arm 95 and edge engaging roll 94 to exert pressure on the edge of the gasket assembly. Slide 101 having a trapezoidal shape and mounted upon the support arm 95 is slidably mounted in a guide slot 102 in the machine support to constrain the support arm 95 for linear movement only. The adjustment of the knob 98 is provided to effect bending or curvature of the gasket assembly. The curvature or bending of the gasket assembly occurs between the compression rolls 103 and 104. The curvilinear deformation of the gasket assembly occurs in the bite or nip between the compression rollers 103 and 104 (FIGS. 1 and 16) which is symbolized with dash lines 105 in FIG. 13. There is actually a compression of metal at the inner diameter and a stretching of metal at the outer diameter with a progressive change therebetween which is represented by such dash lines 105. By reason of the compression or surface constraining rolls 103 and 104 gripping the surfaces of the gasket assembly as they are rolled therebetween, it has been discovered that even though the metal is being deformed by the bending thereof to the radius of curvature, as will be more fully explained, wrinkling of the metal shell during bending is completely or substantially prevented. The slight resilience of the filler material facilitates and is believed to contribute to the controlled edgewise deformation of the shell S in the bite or nip of the compression rolls and the prevention of wrinkling. The importance of this feature of non-wrinkling can be appreciated when it is realized that a gasket is worthless unless it serves its purpose of sealing between two surfaces when installed, and any significant wrinkling would defeat such sealing action. Therefore, the absence of wrinkling which would prevent such gasket sealing function is the key to the success of the gasket of this invention. A restraining plate or strap 106 (FIGS. 1 and 16) is connected between the cantilever shafts 107 and 108 upon which the compression rolls 103 and 104 are respectively rotatably mounted. It has been found to be necessary to utilize the restraining plate or strap 106 to prevent cantilever bending of the shafts 107 and 108 to assure even compression of the gasket assembly during bending, which is also believed to contribute to the non-wrinkling of the metal strips forming the gasket. It should be noted that the gasket assembly is compressed with the greater cross-sectional dimension thereof extending between and along a line parallel to the axes of the compression rollers 103 and 104.

Curve forming rolls 109 and 110, rotatably mounted upon support 111 (FIG. 17), act in combination with the compression rolls 103 and 104 and edge roll 94 to form a curvature of a predetermined amount in the gasket assembly. The rolls 109 and 110 include annular grooves 109a and 110a which, respectively, tightly engage the sides of the gasket assembly and serve to retain the crimped edges of the gasket and may even further crimp the gasket in addition to performing the bending thereof. Slot 111a is provided in the support arm 111 to provide adjustment for the roll 110. The roll 110 may be adjusted by loosening the nut 112 to provide for adjustment of pressure exerted by the roll 110 against the side portion of the gasket assembly which is constrained by the wall of the groove 109a of the roll 109. The arm support 111 (FIG. 2) is slidably mounted upon machine support 113. Adjusting screw 114, with adjusting knob 116, is threadably mounted at 115 (FIG. 13) to the support arm and rotatably mounted to the machine support at 117. Slide 118 mounted on the support arm is slidably mounted in guide slot 119 in the machine support 113 as is the guide 101 in the machine support 96. The slide 118 is trapezoidal in shape. Adjustment of the screw 114 provides the desired curvature to the gasket assembly. The relative positions of the rolls 94, 109 and 110 to the position of the compression rolls 103 and 104 are located so as to provide for edgewise deformation of the gasket assembly within the nip of the compression rolls 103 and 104.

It is understood that the roll pairs 60–61, 62–63, 75–76, 77–78, 79–80, 90–91, 92–93 and 103–104 are powered rolls which are interconnected by gearing to operate at substantially the same speeds in powering the gasket assembly through the apparatus A.

During bending of the gasket assembly in the horizontal plane which is parallel to the planes of the greater dimensions of the rectangular gasket assembly, significant compressive forces occur in the inner portion of the gasket assembly and significant tensile forces occur in the outer portion of the gasket assembly during the bending operation to form the circular gasket. Apparently, the bending of the gasket assembly in the nip of the compression rollers enables uniform bending of the gasket assembly despite the significant compressive and tensile forces while preventing any buckling or wrinkling of the metal shell.

It is also important for the filler of asbestos or similar material to be tightly compacted between the shell S and the liner L to inhibit buckling or wrinkling of the gasket during the bending operation.

After proper adjustment of the rollers 94, 109 and 110 and the compression rolls 103 and 104, the apparatus A may be operated to form a continuous spiral gasket assembly which is thereafter cut into individual circular gasket units for subsequently forming a completed gasket.

It has been found in practice that the previously described structure may form a non-uniform radius of curvature of the spiral gasket assembly. Accordingly, in the preferred embodiment during the bending operation the gasket assembly may be bent to a first predetermined curvature which is slightly smaller than the final desired radius of curvature. The bending rolls 120, 121 and 122 (FIGS. 12 and 18) with edge grooves 120a, 121a and 122a, respectively, which engage the gasket assembly are provided to reduce the first predetermined amount of curvature a second predetermined amount providing a spiral gasket assembly that is of the desired radius of curvature $r$ throughout its spiral that may be formed by continuous operation of the apparatus A. This reduction in the curvature of the gasket assembly apparently relieves stresses in the gasket assembly created by the bending operation to thereby assure the formation of a continuous uniform radius of curvature for the spiral gasket assembly.

The curvature reduction roll 120 is mounted on support arm 123 which includes adjusting slot 124. The adjusting nut 125 on the support 126 may be loosened to provide for adjustment of the arm 123 and roll 120. The support 126 is mounted upon machine support 127.

Bending rolls 121 and 122 are rotatably mounted upon support arm 128 which includes an adjusting slot 129. The support arm 128 is adjustably mounted on the support 130 which is mounted on the machine support 127. Loosening the nut 131 allows adjustment of the support arm 128 relative to the machine support 127. The relative position of the bending rolls 120, 121 and 122 to each other and to the edge rolls 109, 110 and 94 to the compression rolls 103 and 104 may be varied according to the desired radius of curvature of the gasket assembly.

It should be emphasized that the curved double-jacketed gasket assembly is formed from metal strips that are very thin, usually being in the order of 0.018 to 0.020 inches thickness (about 26 gauge) or thinner. It is believed that the failure to produce the gasket of this invention previously has been largely due to the hereto unsolved difficulties in forming a uniform bend or radius of curvature in such thin metal without buckling or wrinkling the gasket assembly during the bending operation. It should also be noted by way of example, that the metal strips 50 and 53 are narrow in width, ranging from about ¼ inch to about 2 inches usually, depending upon the width of the gasket desired, and by the use of such strips, there is virtually no wasted metal, as contrasted to the prior art method and materials used for making gaskets.

The method for forming the spiral gasket assembly can be understood from the drawings together with the above-described procedure using the apparatus A. After the spiral gasket assembly is formed, the gasket units are severed from the gasket assembly for forming a completed gasket. The severed ends 132 and 133 (FIG. 20) of the gasket unit are cut to overlap a small amount. After removing the gasket unit from the gasket assembly the gasket unit may be placed in a form that constrains the gasket to a slightly larger circumference than the desired circumference. A saw is used to cut the gasket at 134 with the slightly larger circumference permitting the ends 132a and 133a to overlap a slight amount 135 as indicated in FIG. 21 when the gasket assembly is at the desired circumference.

The next step is to uncrimp the shell side portions 52 so that a portion of the asbestos core C can be removed by cutting it at C', whereby the liner can be bent back as illustrated in FIG. 21.

After the piece of selected length of asbestos filler is removed and the liner is bent back, the ends of the gasket may be smoothed off as necessary. Then a portion of each end 132a and 133a of the shell S is completely uncrimped to form a flat end portion that may be welded together in an electric welding machine or other suitable equipment that presses the overlapped end portions together while subjecting them to a high voltage to effect the welding. A Z-bar locating jig 136 or similar means includes a step Z-shaped portion 137 or the like to insure that the ends of the first shell portion are overlapped the proper amount during the welding to provide the desired diameter of the finished gasket. A welding electrode 138, schematically shown in FIG. 22, presses the lower shell assembly against a welding electrode (not shown) below the overlapping edges 132a and 133a to form the weld at the overlap 135.

The end portions 139 of the liner L are likewise welding in overlapping arrangement in the manner of the end portions 132a and 133a of the shell S. Some finish work may be necessary on the welds formed in the shell and liner to maintain a smooth surface on the outer portion of the gasket. After the shell and liner are united by welding, a new strip C-1 of asbestos filler is cut to replace the removed strip of asbestos filler.

The preselected length of asbestos filler is inserted in the shell to form a continuous circle of asbestos filler and the side portions 52 of the shell S are then re-crimped in a jig to complete the gasket. The finished gasket, as shown in FIGS. 23 and 24, so formed by the above method and apparatus includes only a single weld joint throughout the entire circumference of the gasket instead of the multiple welds usually required in the prior art gaskets. Further, such weld is relatively short in length as compared to the welding required to piece together metal sheets as in the prior art. Such single weld construction is thus less costly and less time-consuming, and it further minimizes grinding of the welds to a smooth finish. With only a single weld, there is less chance for a seal to be defective than when there are multiple welds, each of which could be defective if not properly made or ground smooth.

The foregoing disclosure and description of the invention are illustrative and explanatory thereof, and various changes in the size, shape, and materials as well as in the details of the illustrated construction may be made without departing from the spirit of the invention.

We claim:

1. The method of forming a circular double-jacketed gasket from a substantially linear double-jacketed gasket assembly having a substantially rectangular cross-section including a first metal strip forming a shell having a base portion and side portions with the width dimension of the base portion being greater than the dimension of the side portions, a filler strip of resilient core material confined between said side portions and a second metal strip forming a liner having a base portion overlying the core and substantially the same width dimension as the base portion of the first metal strip with the outer edges of the second metal strip confined by the side portions of the first metal strip, comprising:
   compressing the base portions of the linear double-jacketed gasket assembly with a substantially even compression between compression rolls;
   curving the linear double-jacketed gasket assembly edgewise in a plane parallel to said base portions a predetermined amount at the nip between the compression rolls to form a uniform, circular gasket assembly having a predetermined radius of curvature with the metal shell and liner being free of undesired buckling or wrinkling;
   severing a circular gasket unit from the gasket assembly; and
   securing together the severed ends of the circular gasket unit to form a circular double-jacketed gasket having a single joint connection about its entire circumference.

2. The method of claim 1, wherein:
   the step of curving the gasket assembly a predetermined amount includes curving the gasket assembly a greater amount than the desired radius of curvature of the finished circular gasket unit; and
   reducing the radius of curvature of the gasket assembly to the radius of curvature of the desired circular gasket unit to relieve stresses in the assembly and provide uniform curvature of the gasket assembly.

3. The method of claim 1 wherein:
   the step of securing the ends of circular gasket unit comprises forming single welds in the shell and liner to provide a circular double-jacketed gasket having a single weld joint throughout its entire circumference.

4. The method of forming a circular double-jacketed gasket, comprising:
   forming a linear double-jacketed gasket assembly having a substantially rectangular cross-section including a metal shell and metal liner encasing a strip of resilient core material;
   compressing the gasket assembly with a substantially even compression with the greater cross-sectional dimension thereof extending between and along a line parallel to the axes of a pair of compression rolls;
   bending the gasket assembly edgewise in the plane parallel to the bases having the greater dimension a predetermined amount at the nip between the compression rolls to form a circular gasket assembly having a predetermined radius of curvature free of undesired buckling or wrinkling in the metal shell and liner;
   severing a circular gasket unit from the gasket assembly; and
   securing together the severed ends of the circular gasket unit to form a circular double-jacketed gasket having a single joint connection about its entire circumference.

5. The method of claim 4 wherein:
   the step of curving the gasket assembly includes slightly reducing the predetermined amount of radius of curvature by edgewise bending the gasket assembly a predetermined amount in the opposite direction of the first bending to relieve stresses in the assembly and provide a uniform curvature for the circular gasket assembly.

6. The method of claim 4, wherein:
   the step of securing together the severed ends of the gasket unit includes welding the ends to provide a circular double-jacketed gasket having a single weld joint throughout its entire circumference.

7. The method of claim 6 wherein:
   the step of severing includes forming a gasket unit having a circumference slightly larger than the desired circumference of the finished gasket; and
   welding the severed ends of the shell and the severed ends of the liner in slightly overlapping relationship an amount sufficient to provide the desired circumference of the finished gasket.

8. The method of forming a circular double-jacketed gasket from a substantially linear double-jacketed gasket assembly having a substantially rectangular cross-section including a first metal strip forming a shell having a base portion and side portions with the width dimension of the base portion being greater than the dimension of the side portions, a filler strip of resilient core material confined between said side portions and a second metal strip forming a liner having a base portion overlying the core and substantially the same width dimension as the base portion of the shell with the outer edges of the liner confined by the side portions of the shell comprising:

compressing the base portions of gasket assembly with a substantially even compression between compression rolls;

curving the gasket assembly edgewise in a plane parallel to said base portions a first predetermined amount at the nip between the compression rolls to form a circular gasket assembly having a first predetermined radius of curvature of the finished gasket unit and the metal shell and liner being free of undesired buckling or wrinkling;

reducing the radius of curvature of the gasket assembly to the radius of curvature of the desired circular gasket unit to relieve stresses in the assembly and provide uniform curvature of the gasket assembly;

severing a circular gasket unit from the gasket assembly forming a gasket unit having a circumference slightly larger than the desired circumference of the finished gasket; and welding the severed ends of the shell and the severed ends of the liner in slightly overlapping relationship an amount sufficient to provide the desired circumference of the finished gasket having a single weld joint above its entire circumference.

9. An apparatus for forming a double-jacketed gasket from a plurality of metal shell strips and a strip of resilient core material comprising:

means for forming a linear gasket assembly having a substantially rectangular cross-section, formed by a metal shell and a metal liner formed from the metal strips with the core material encased by the metal shell and liner;

means for curving the gasket assembly edgewise in the plane of its greater dimension a predetermined amount to form a uniform circular gasket assembly free of undesired buckling or wrinkling; and the curving means including a plurality of compression rollers that compress the sides of the gasket assembly having the greater dimension with the axes of the rollers maintained substantially parallel to the gasket sides; and the curving means including a plurality of curving rolls encasing the shell and positioned and arranged to curve the linear gasket assembly in the nip of the compression rollers.

10. The apparatus of claim 9, including:
means for severing a circular gasket unit from the circular gasket assembly.

11. The apparatus of claim 10 including:
means for welding together the ends of the shell and the ends of the liner of the circular gasket unit in slightly overlapping relationship to form a circular double-jacketed gasket having a desired circumference and having a single weld joint connection about its entire circumference.

12. The apparatus of claim 10 including:
means for securing together the severed ends of the gasket unit to form a circular double-jacketed gasket having a single joint connection about its entire circumference.

13. The apparatus of claim 9 wherein:
the curving means comprises means for curving the linear gasket assembly edgewise in the plane of its greater dimension a first predetermined amount; and a second curving means for bending the curved gasket assembly edgewise in the plane of its greater dimension to reduce said first predetermined radius of curvature by a second predetermined amount to relieve stresses in the circular gasket assembly and provide a uniform radius curvature to the circular gasket assembly.

14. The apparatus as set forth in claim 9 wherein:
the compression rolls compress the gasket assembly sides having the greater dimension with an even compression.

15. An apparatus for forming a circular double-jacketed gasket assembly comprising:
means for forming a double-jacketed linear gasket assembly having a substantially outer rectangular metal casing surrounding an inner core of resilient fibrous material;

means for curving the linear gasket assembly edgewise a predetermined amount in the plane of its greater dimension to form a circular gasket assembly having a uniform cross-section free of undesired buckling or wrinkling in the metal shell;

the curving means including a plurality of compression rolls that compress the sides of the gasket assembly having the greater dimension with a substantially even compression; and means for curving the gasket assembly edgewise a predetermined amount in the nip of the compression rolls to form a circular gasket assembly having a uniform cross-section free of undesired buckling or wrinkling in the metal shell.

16. The apparatus of claim 15 wherein:
the means for curving includes a plurality of rolls positioned and arranged to engage the gasket assembly for curving the gasket assembly in the nip of the compression rolls.

17. The apparatus of claim 15 wherein:
the curving means includes a means for curving the gasket assembly to a radius of curvature of a first predetermined amount; and a second means for edgewise reducing the first radius of curvature of the gasket assembly in the plane of its greater dimension a second predetermined amount to relieve stresses in the metal shell and provide a uniform curvature in the circular gasket assembly.

18. The apparatus of claim 17 wherein:
the curving means and the second means include a plurality of rolls positioned and arranged to engage the gasket assembly to curve the gasket assembly the first and second predetermined amounts.

19. An apparatus for forming a double-jacketed gasket from a plurality of metal shell strips and a strip of resilient core material comprising:

a plurality of powered rolls for forming a linear, substantially rectangular gasket assembly having a metal shell with a base portion and side portion, a metal liner with a base portion retained by inwardly bend ends of the shell side portions with the core material enclosed by the metal shell and liner;

means for curving the gasket assembly edgewise in the plane of its greater dimension a predetermined amount to form a uniform circular gasket assembly free of undesired buckling or wrinkling including a plurality of compression rolls that compress the base portions of the gasket assembly having the greater dimension with a substantially even compression and a plurality of curving rolls positioned and arranged to curve the linear gasket assembly in the nip of the compression rollers; and a first plurality of the rolls engaging the side portions of the gasket assembly for curving the linear gasket assembly edgewise at the nip of the compression rolls in the plane of its greater dimension a first predetermined amount and a second plurality of the rolls engaging the side portions of the gasket assembly for bending the curved gasket assembly edgewise in the plane of its greater dimension to reduce said first predetermined amount of curvature by a second predetermined amount to relieve stresses in the circular gasket assembly and provide a uniform curvature to the circular gasket assembly.

20. The apparatus of claim 19 including:
means for severing a circular gasket unit from the gasket assembly having a circumference greater the desired circumference of the finished gasket assembly.

21. A circular double-jacketed gasket comprising:
a circular double-jacketed gasket having a metal outer cover in the order of 0.018 to 0.020 inches thickness of substantially rectangular cross-section and an inner core of resilient fibrous material with the greater rectangular dimension lying in the plane of the gasket radius; and
a single weld joint about the entire circumference of the metal cover means forming a completed circular gasket.

22. A single weld joint, circular double-jacketed gasket comprising:
a first circular metal shell means having a base portion, upstanding sides with inwardly bent retaining end portions;
a circular core of resilient fibrous material disposed on the base portion and between the side portions of the first metal shell means;
a circular flat second metal liner means disposed on the core and retained thereupon by the inwardly bent retaining end portions forming an outer metal jacket of substantially rectangular cross-section; and
a single weld joint about the entire circumference of the metal shell means and metal liner means forming a completed circular gasket.

23. A method of forming a double-jacketed circular metal gasket, comprising the steps of:
superimposing a first linear metal strip on a second linear metal strip, with a non-metallic flexible linear resilient core strip therebetween, wherein the second strip is wider than the first strip and forms the shell;
thereafter bending the linear edges of the second strip around the linear edges of the first strip, whereby a gasket assembly is provided with the first strip forming a liner enclosing the core material between the shell and the liner;
passing the gasket assembly between a first pair of compression rolls and applying substantially even pressure on the gasket assembly at the nip between the rolls; and
exerting a bending force on one linear edge of the gasket assembly at a point beyond the compression rolls while the pressure is applied at the nip between the rolls for forming the gasket assembly into a circular configuration having a predetermined radius and with said one linear edge becoming an outer edge thereof.

24. The method of claim 23 including the step of:
applying a linear restraining force on the other linear edge of the gasket assembly at a point in advance of the compression rolls to restrain the gasket assembly from lateral movement when the bending force is applied to said outer edge, whereby the desired predetermined radius of curvature is obtained.

25. The method of claim 24 including the step of:
passing the gasket assembly through a plurality of final forming rolls prior to passing it through the pair of compression rolls for providing final forming of the assembly and controlled linear feeding of the gasket assembly during the bending thereof at the compression rolls.

26. The method of claim 23 including the step of:
applying a slight reverse bending to the gasket assembly after it has been bent to the circular configuration to relieve stresses in the metal strips and assure a permanent circular configuration of the desired radius.

27. The method of claim 23 including the steps of:
severing a substantially circular portion from the gasket assembly after it has been bent to the circular configuration; and
joining the ends of such severed portions to form the final double-jacketed circular gasket having a single joint connection throughout its entire circumference.

28. An apparatus for forming a double-jacketed circular metal gasket comprising:
means for superimposing a first linear metal strip on a second linear metal strip with a non-metallic flexible linear resilient core strip therebetween, wherein the second strip is wider than the first strip and forms the shell;
means for bending the linear edges of the second strip around the linear edges of the first strip, whereby a gasket assembly is provided with the first strip forming a liner enclosing the core material between the shell and the liner;
a first pair of compression rolls for applying a substantially even pressure on the gasket assembly at the nip between the rolls; and
means for exerting a bending force on one linear edge of the gasket assembly at a point beyond the compression rolls while the pressure is applied at the nip between the rolls for forming the gasket assembly into a circular configuration having a predetermined radius with said one liner edge becoming the outer edge thereof.

29. The apparatus of claim 28 comprising:
means for applying a linear restraining force on the other linear edge of the gasket assembly at a point in advance of the compression rolls to restrain the gasket assembly from lateral movement when the bending force is applied to said outer edge, whereby the desired predetermined radius of curvature is obtained.

30. The apparatus of claim 29 comprising:
a second pair of compression rolls positioned to engage the gasket assembly prior to passing it through the first pair for providing a controlled linear feeding and restraint of the gasket assembly during the bending thereof at the first pair of rolls.

31. The apparatus of claim 28 comprising:

means for applying a slight reverse bending to the gasket assembly after it has been bent to the circular configuration to relieve stresses in the metal strips and assure a permanent circular configuration of the desired radius.

32. The apparatus of claim 28 comprising:
means for severing a substantially circular portion from the gasket assembly after it has been bent to the circular configuration; and
means for joining the ends of such severed portions to form the final double-jacketed circular gasket having a single joint connection throughout its entire circumference.

33. The apparatus of claim 32 wherein:
the means for severing includes means for constraining the gasket assembly at a circumference slightly larger than the desired circumference of the finished gasket; and
the means for joining includes a welding means with means to weld the severed ends of the gasket unit in overlapping arrangement said slightly larger amount to provide said desired circumference.

34. The method of forming a circular double-jacketed gasket assembly, comprising the steps of:
forming a double-jacketed linear gasket assembly having a substantially outer rectangular metal casing surrounding an inner core of resilient fibrous material;
curving the linear gasket assembly edgewise a predetermined amount in the plane of its greater dimension to form a circular gasket assembly having a uniform cross-section free of undesired buckling or wrinkling in the metal shell;
the step of curving including compressing the gasket assembly in the plane of its greater dimension between compression rolls whose axis of rotation are maintained substantially parallel to said plane; and
curving the gasket assembly edgewise in said plane a predetermined amount at the nip between the compression rolls to form a uniform, circular gasket assembly having a predetermined radius of curvature with the metal shell and liner being free of undesired buckling or wrinkling.

35. The method of claim 34, including the step of:
reducing slightly the predetermined amount of curvature to relieve stresses in the assembly and provide a uniform curvature for the gasket assembly.

36. The method as set forth in claim 34 wherein:
the step of compressing includes applying a substantially even compression force across the gasket casing in the plane of the casing greater dimension.

37. The circular double-jacketed gasket formed from a substantially linear double-jacketed gasket assembly having a substantially rectangular cross-section including a first metal strip forming a shell having a base portion and side portions with the width dimension of the base portion being greater than the dimension of the side portions, a filler strip of resilient core material confined between said side portions and a second metal strip forming a liner having a base portion overlying the core and substantially the same width dimension as the base portion of the first metal strip with the outer edges of the second metal strip confined by the side portions of the first metal strip, whereby the gasket is formed by the following method steps:
compressing the base portions of the linear double-jacketed gasket assembly with a substantially even compression between compression rolls;
curving the linear double-jacketed gasket assembly edgewise in a plane parallel to said base portions a predetermined amount at the nip between the compression rolls to form a uniform, circular gasket assembly having a predetermined radius of curvature with the metal shell and liner being free of undesired buckling or wrinkling;
severing a circular gasket unit from the gasket assembly; and
securing together the severed ends of the circular gasket unit to form a circular double-jacketed gasket having a single joint connection in the liner and shell about its entire circumference.

38. The circular double-jacketed gasket formed by the following method steps:
forming a linear double-jacketed gasket assembly having a substantially rectangular cross-section including a metal shell and metal liner encasing a strip of resilient core material;
compressing the gasket assembly with a substantially even compression with the greater cross-sectional dimension thereof extending between and along a line parallel to the axes of a pair of compression rolls;
bending the gasket assembly edgewise in the plane parallel to the bases having the greater dimension a predetermined amount at the nip between the compression rolls to form a circular gasket assembly having a predetermined radius of curvature free of undesired buckling or wrinkling in the metal shell and liner;
severing a circular gasket unit from the gasket assembly; and
securing together the severed ends of the circular gasket unit to form a circular double-jacketed gasket having a single joint connection in the liner and shell about its entire circumference.

39. The circular double-jacketed gasket formed from a substantially linear double-jacketed gasket assembly having a substantially rectangular cross-section including a first metal strip forming a shell having a base portion and side portions with the width dimension of the base portion being greater than the dimension of the side portions, a filler strip of resilient core material confined between said side portions and a second metal strip forming a liner having a base portion overlying the core and substantially the same width dimension as the base portion of the shell with the outer edges of the liner confined by the side portions of the shell, whereby the gasket is formed by the following method steps:
compressing the base portions of gasket assembly with a substantially even compression between compression rolls;
curving the gasket assembly edgewise in a plane parallel to said base portions a first predetermined amount at the nip between the compression rolls to form a circular gasket assembly having a first predetermined radius of curvature of the finished gasket unit and the metal shell and liner being free of undesired buckling or wrinkling;
reducing the radius of curvature of the gasket assembly to the radius of curvature of the desired circular gasket unit to relieve stresses in the assembly and provide uniform curvature of the gasket assembly;
severing a circular gasket unit from the gasket assembly forming a gasket unit having a circumference slightly larger than the desired circumference of the finished gasket; and welding the severed ends of the shell and the severed ends of the liner in slightly overlapping relationship an amount sufficient to provide the desired circumference of the finished gasket having a single weld joint in the liner and shell above its entire circumference.

40. The double-jacketed circular metal gasket formed by the following method steps:

superimposing a first linear metal strip on a second linear metal strip, with a non-metallic flexible linear resilient core strip therebetween, wherein the second strip is wider than the first strip and forms the shell;

thereafter bending the linear edges of the second strip around the linear edges of the first strip, whereby a gasket assembly is provided with the first strip forming a liner enclosing the core material between the shell and the liner;

passing the gasket assembly between a first pair of compression rolls and applying substantially even pressure on the gasket assembly at the nip between the rolls;

exerting a bending force on one linear edge of the gasket assembly at a point beyond the compression rolls while the pressure is applied at the nip between the rolls for forming the gasket assembly into a circular configuration having a predetermined radius and with said one linear edge becoming an outer edge thereof; and forming a single weld joint about the entire circumference of the liner and shell of the circular double-jacketed gasket assembly to form the circular double-jacketed gasket.

41. The circular double-jacketed gasket assembly formed by the following method steps:

forming a double-jacketed linear gasket assembly having a substantially outer rectangular metal casing surrounding an inner core of resilient fibrous material;

curving the linear gasket assembly edgewise a predetermined amount in the plane of its greater dimension to form a circular gasket assembly having a uniform cross-section free of undesired buckling or wrinkling in the metal shell;

the step of curving including compressing the gasket assembly in the plane of its greater dimension between compression rolls whose axis of rotation are parallel to said plane;

curving the gasket assembly edgewise in said plane a predetermined amount at the nip between the compression rolls to form a uniform, circular gasket assembly having a predetermined radius of curvature with the metal shell and liner being free of undesired buckling or wrinkling; and forming a single weld joint about the entire circumference of the liner and shell of the circular double-jacketed gasket assembly to form a circular double-jacketed gasket.

* * * * *

Dislcaimer

4,059,215.—*Alfred B. Owen and Bruce M. Gifford*, Houston, Tex. CIRCULAR DOUBLE-JACKETED GASKET WITH SINGLE JOINT. Patent dated Nov. 22, 1977. Disclaimer filed Mar. 15, 1982, by the assignee, *Lamons Metal Gasket Co.*

Hereby enters this disclaimer to claims 21 and 22 of said patent.

[*Official Gazette April 20, 1982.*]